April 22, 1952     J. R. MAAG     2,593,586
BUMPER
Filed June 27, 1950
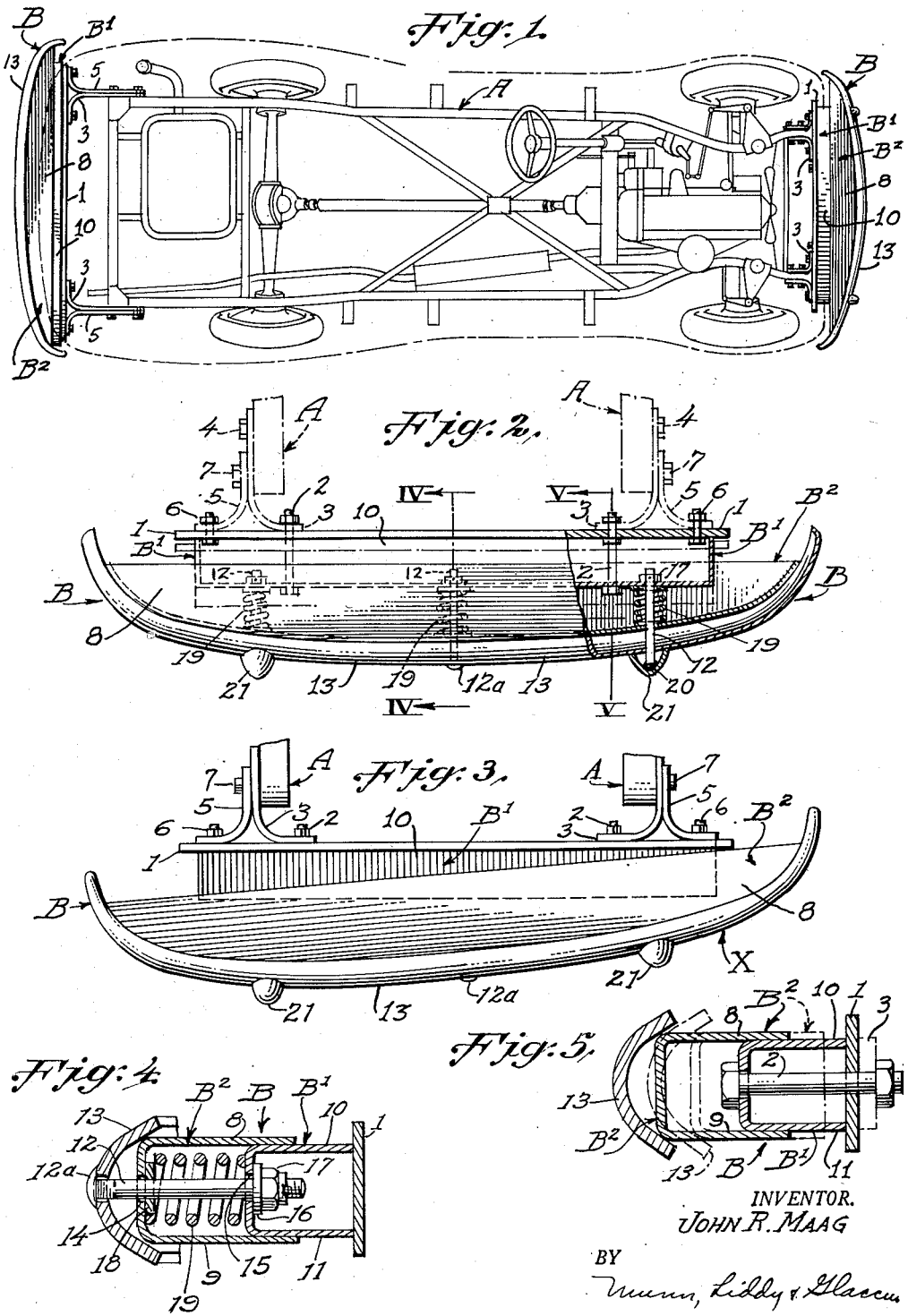
INVENTOR.
JOHN R. MAAG
BY
ATTORNEYS.

Patented Apr. 22, 1952

2,593,586

UNITED STATES PATENT OFFICE 2,593,586

BUMPER

John Rudolf Maag, San Francisco, Calif.

Application June 27, 1950, Serial No. 170,527

1 Claim. (Cl. 293—85)

An object of my invention is to provide a bumper for vehicles such as automobiles, trucks and the like, wherein the bumper comprises two telescoping parts that house the compression springs for absorbing the shocks. A streamlined appearance for the bumper results from such a structure.

A further object of my invention is to provide a device of the type described in which a stationary casing supports a movable casing. The shock absorbing springs supporting the movable casing will permit either end of the impact bar of the bumper to be move independently of the other end. For example, if a blow from another vehicle or object strikes the impact bar at one end, this end will move against the compression springs associated therewith. In this way the bumper is adapted to withstand a blow at any place along its entire length.

A further object of my invention is to provide a device of the type described which is simple in construction and durable and efficient for the purpose indicated.

Other objects and advantages will appear in the following specification, and the novel features of the device will be particularly pointed out in the appended claim.

My invention is illustrated in the accompanying drawing form a part of this application, in which:

Figure 1 is a top plan view of a vehicle showing my bumper applied to both the front and the rear ends of the chassis;

Figure 2 is an enlarged top plan view of the bumper, a portion being shown in section to illustrate the internal construction;

Figure 3 is a top plan view of the bumper shown in Figure 2 and illustrates how the bumper will react under the impact of a blow;

Figure 4 is a section taken along the line IV—IV of Figure 2; and

Figure 5 is a section taken along the line V—V of Figure 2.

While I have shown only the preferred form of my invention, it should be understood that various changes or modifications may be made within the scope of the appended claims without departing from the spirit and scope of the invention.

In carrying out my invention, I make use of a vehicle chassis indicated generally at A in Figure 1. I mount my bumper indicated generally at B at both the forward and rear ends of the chassis. Inasmuch as the forward and rear bumpers are identical, a detailed description of the rear one will suffice for both.

In Figures 1 and 2, it will be noted that the bumper B has a supporting and stationary casing B1 that is connected to a bar 1 by bolts 2. These bolts also secure the outer end of a curved strap 3 to the bar. The other end of the strap 3 is connected to the chassis A by bolts 4 or other suitable fastening means. A second curved strap 5 is secured to the bar 1 by a bolt 6 and has its other end secured to the chassis A by a bolt 7. Both ends of the bar 1 are secured to the front end of the chassis A by the elements 2 to 7, inclusive, which have just been described.

It will be seen that the stationary casing B1 is rigidly secured to the chassis A. The bumper B also has a telescoping casing B2 that has its top and bottom walls 8 and 9, respectively, slidably receiving the top and bottom walls 10 and 11 of the casing B1, see Figure 4. The movable casing B2 is connected to the stationary casing B1 by bolts 12. I show three connecting bolts, although I do not wish to be confined to any particular number. The central bolt 12 of the three has its head 12a permanently secured to an impact bar 13 of the bumper. The bar 13 is U-shaped in cross section as shown in Figure 4. The central bolt 12 extends through an opening 14 in the movable casing B2 and extends through another opening 15 in the stationary casing B1. The openings 14 and 15 loosely receive the bolts 12 so as to permit an angular movement of the movable casing B2 with respect to the stationary casing B1 as shown in Figure 3. A washer 16 and a nut 17 are mounted on the inner end of the central bolt 12. A second washer 18 is mounted on the central bolt 12 and bears against the inner surface of the telescoping casing B2. A compression spring 19 bears against the washer 18 and against the outer surface of the stationary casing B1.

I have described the construction of the central spring support for the telescoping part B2. The other two spring supports are of identical construction except that the outer ends of the bolts 12 are welded at 20 to horns 21 that are carried by the impact bar 13.

From the foregoing description of the various parts of the device, the operation thereof may be readily understood.

It will be seen from the above construction that the telescoping casing B2 encloses the shock absorbing spring supports and the stationary casing B1 encloses the inner ends of the bolts 12 and conceals the greater portion of the fastening bolts 2. In Figure 3, I show how the casing B2 can move with respect to the stationary casing B1 when a blow is received at one end of the bumper, as indicated at the point X. The right hand compression spring 19 when looking at Figure 3 will compress under such a blow, while the left hand compression spring need not give to any appreciable extent. The outer casing B2 will telescope over the inner one in the manner shown in Figure 3. The bolts 12 being loosely received in the openings 14 and 15 permit the angular movement of the casing B2 with respect to the casing B1 in Figure 3. A blow can be received at any point along the impact bar 13.

The bolts 12 cooperate with the compression springs 19 and limit the outward movement of the casing B2 with respect to the stationary casing B1. The portions of the bolts 12 projecting beyond the stationary casing B1 are concealed by the movable casing B2 and so are likewise the coil springs 19. The stationary casing B1 conceals the portions of the bolts 2 extending from the bar 1 to the heads of the bolts. Therefore, the two telescoping casings B1 and B2 conceal the shock absorbing springs as well as the fastening bolts.

I claim:

A vehicle bumper comprising a supporting bar securable to a vehicle chassis and extending from side to side of the chassis; a stationary casing U-shaped in cross section and having a length substantially equal to the length of the bar, the sides of the casing being disposed in a horizontal plane and abutting the bar; bolts securing the casing to the bar; a movable casing U-shaped in cross section and telescoping over the closed side of the stationary casing so as to be slidably supported thereby and having a length substantially equal to the width of the vehicle body; an impact bar extending along the closed side of the movable casing; bolts for securing the impact bar to the movable casing and extending through aligned openings in the closed sides of the movable and stationary casings; coil springs encircling the bolts and being enclosed in the movable casing, the ends of the springs bearing against the closed sides of the movable and stationary casings; and nuts secured to the inner ends of the bolts and bearing against the closed side of the stationary casing for limiting the outward movement of the movable casing with respect to the stationary casing and caused by the springs; the two casings providing housings for the bolts and springs that extends at least across the width of the chassis.

JOHN RUDOLF MAAG.

REFERENCES CITED

The following references are of record in the file of this patent:

UNITED STATES PATENTS

| Number | Name | Date |
| --- | --- | --- |
| 1,618,394 | Voyatis | Feb. 22, 1927 |
| 2,003,645 | Dalton | June 4, 1935 |
| 2,145,952 | Ryan | Feb. 7, 1939 |
| 2,312,052 | Premo | Feb. 23, 1943 |